J. H. TEMPLIN.
AUTOMATIC LUBRICATING DEVICE.
APPLICATION FILED OCT. 18, 1912.

1,120,344.

Patented Dec. 8, 1914.

WITNESSES:
Paul H. Burk

INVENTOR
Joseph H. Templin

UNITED STATES PATENT OFFICE.

JOSEPH H. TEMPLIN, OF PHILADELPHIA, PENNSYLVANIA, ASSIGNOR, BY MESNE ASSIGNMENTS, TO SANTO MANUFACTURING COMPANY, OF PHILADELPHIA, PENNSYLVANIA, A CORPORATION OF DELAWARE.

AUTOMATIC LUBRICATING DEVICE.

1,120,344.      Specification of Letters Patent.      Patented Dec. 8, 1914.

Application filed October 18, 1912. Serial No. 726,584.

*To all whom it may concern:*

Be it known that I, JOSEPH H. TEMPLIN, a citizen of Philadelphia, residing at Philadelphia, in the county of Philadelphia and State of Pennsylvania, have invented certain new and useful Improvements in Automatic Lubricating Devices, of which the following is a specification.

The invention relates to lubricating devices and more particularly to lubricating devices which are adapted to lubricate the lower or thrust bearing of a high speed motor of a vertical type.

An object of the invention is to provide a lubricating device for both the vertical and lateral bearing of the shaft, which lubricating device is so constructed as to furnish a lubricant to the vertical bearing, which lubricant may be carried up along said vertical bearing and across said lateral bearing and the surplus lubricant returned to a reservoir.

Figure 1:
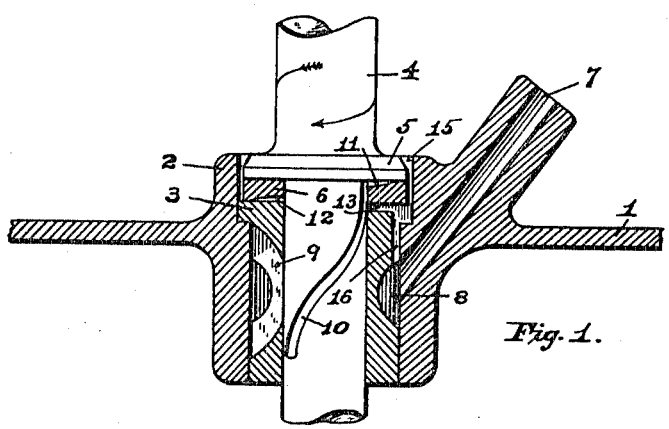
Figure 2:
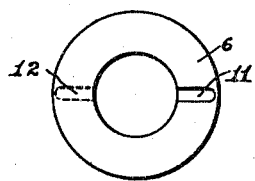
Figure 3:
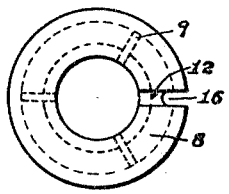
Figure 4:
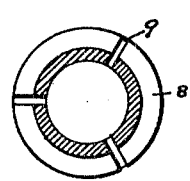

In the drawings, which show by way of illustration one embodiment of the invention Figure 1 is a vertical sectional view through the supporting frame and the supporting bearing for the vertical shaft; Fig. 2 is a plan view of the anti-friction collar; Fig. 3 is a plan view of the bushing; and Fig. 4 is a horizontal sectional view through the bushing.

Referring to the drawings, 1 is the main frame provided with a boss 2 in which is inserted bushing 3.

4 is the shaft provided with a thrust flange 5, and 6 is an anti-friction collar disposed between said flange and said bushing.

7 is a lubricant passage leading to reservoir 8 which surrounds bushing 3 and is provided with slots 9 to convey the lubricant to the shaft bearing.

10 is a spiral groove cut in shaft 4 which, by the rotation of the shaft, conveys the lubricant to the top of the shaft bearing where the centrifugal force expels it through the grooves 11 and 12 in the collar 6 and also through the lateral groove 13 disposed in the upper face of bushing 3.

15 is an overflow pocket for the excess lubricant, and 16 is the vertical passage leading from said pocket 15 down to the reservoir 8, whereby said excess can return to the reservoir and again pass through the cycle of lubrication.

The operation of the device can be readily understood from the foregoing description, and it is also evident that with various modifications those skilled in the art can make and use the same, under conditions and circumstances varying from the above and remain within the scope of my invention.

Having thus described my invention, and what I claim, and for which I desire Letters Patent is as follows:—

1. The combination of a vertical shaft having a thrust flange thereon, of a lubricating bearing therefor including a supporting frame, a bushing mounted therein, and an anti-friction collar located between said bushing and said thrust flange, said bushing having a reservoir for a lubricant formed therein, and slots leading from said reservoir to the inner face of the bushing, said anti-friction collar having grooves formed in the upper and lower faces thereof leading to an overflow pocket for the excess of lubricant, said bushing also having a groove connecting the overflow pocket with the reservoir, and said shaft having a spiral groove formed therein for feeding the lubricant upward along the shaft to the anti-friction collar.

2. The combination with a vertical shaft having a thrust flange, of a lubricating bearing therefor including a supporting frame, a bushing mounted in said frame, and having an annular groove in its outer face with vertical slots leading from the groove to the inner face of the bushing, said frame having a passage leading therethrough to said annular groove in the bushing, an anti-friction collar between the upper face of said bushing and said thrust flange, said collar having radial grooves formed therein leading to an overflow pocket formed in said bushing, said bushing having a passage leading from said pocket to said annular groove, and said shaft having a spiral groove formed therein extending from a point below the annular groove in the bushing to a point above the said anti-friction collar.

In testimony whereof I affix my signature in presence of two witnesses.

JOSEPH H. TEMPLIN.

Witnesses:
CHAS. W. RUETER,
GUY B. HELMS.